INVENTOR
ROLLAND A. RICHARDSON
BY
WARREN, BROSLER, CYPHER & ANGLIM
ATTORNEYS

United States Patent Office 3,349,669
Patented Oct. 31, 1967

3,349,669
RAM ATTITUDE CONTROL SYSTEM
Rolland A. Richardson, 1034 Taylor Ave.,
Alameda, Calif. 94501
Filed Apr. 20, 1966, Ser. No. 543,864
10 Claims. (Cl. 91—171)

My invention relates to machines such as hydraulically powered shears, press brakes or the like, in which a ram carrying a tool performs an operation on work; and more particularly relates to a hydraulic leveling system for maintaining a level of pre-established attitude of the ram of such machine.

Leveling systems are known in the art, but the demand for perfection in work to be accomplished calls for greater sensitivity and accuracy in leveling, as well as in other functioning parts of a machine.

In leveling systems designed for controlling the attitude of a ram in a shear, press brake or the like, a control tape wrapped about a pair of spaced sheaves mounted on the back of the ram, has one end anchored to a point on the frame of the machine while the other end is coupled under spring tension to a servo valve, which responds to a deviation of the ram from a desired attitude, to proportionately bleed hydraulic liquid from one side or the other of the machine depending on the direction of such deviation, to thereby restore the ram back to its previously prevailing attitude.

The term "leveling" is employed in a loose sense as applying to a system capable of restoring a deviating ram to its previously prevailing attitude, whether or not such attitude represented a level status of the ram.

Among the objects of my invention are:

(1) To provide a novel and improved hydraulic leveling system;

(2) To provide a novel and improved hydraulic leveling system which will be extremely sensitive to any deviation of a ram from its prevailing attitude to immediately create a strong correction factor;

(3) To provide a novel and improved hydraulic leveling system capable of use in a hydraulically powered machine having two hydraulic motors for driving the ram and a pair of pumps for powering such hydraulic motors;

(4) To provide a novel and improved leveling system which is exceedingly fast in effecting a correction when stimulated by an attempted departure of a ram from its prevailing attitude;

(5) To provide a novel and improved hydraulic leveling system which will have a non-proportional correction characteristic in a direction to provide extremely fast responses to attempted deviations of a ram, and which will perform without hunting.

Additional objects of my invention will be brought out in the following description of a preferred embodiment of the same, taken in conjunction with the accompanying drawings, wherein.

Figure 1:
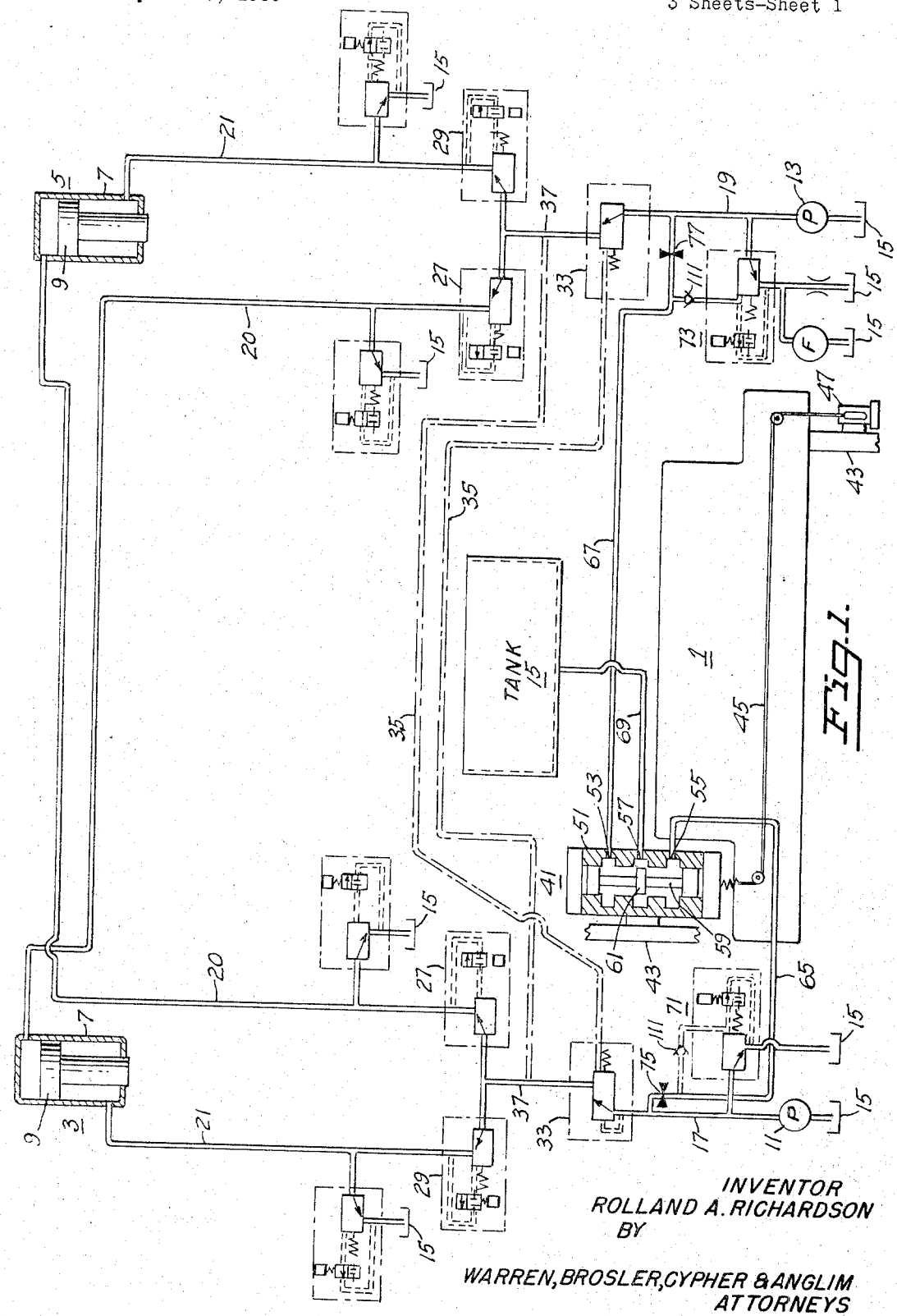
FIGURE 1 is a schematic view of a hydraulic system of a shear or the like, incorporating the hydraulic leveling system of the present invention.

Referrng to the drawings for details of my invention in its preferred form, I have depicted in outline, the ram 1 of a machine, and displaced therefrom, a pair of hydraulic motors 3 and 5, each comprising a cylinder 7 and an included drive piston 9, it being understood, that each motor will be coupled to a different end of the ram.

These drive motors are supplied with hydraulic liquid from a pair of pumps 11 and 13, supplied with hydraulic liquid from a tank 15, each pump having a discharge line 17, 19 respectively, with a flow connection in the form of a branch line 20 to the upper end of one of the motor cylinders 7, and another branch line 21 to the lower end of the other motor cylinder. Expressed in other words, one branch line 19 extends to the drive side of one piston, while the other branch line 21 extends to the lift side of the other piston.

Selectively operable valve means in the form of a solenoid control valve 27 in one branch line and a solenoid control valve 29 in the other branch line, from each pump will cause each pump to supply power to one hydraulic motor for a work stroke and power to the other hydraulic motor for a return or lift stroke. This has the advantage over a system where each pump supplies the power for the work stroke and the lift stroke to the same hydraulic motor, for such system necessitates a reversing of the hydraulic lines to each hydraulic motor when changing from a work stroke to a lift stroke, which in turn requires a corresponding reversal of lines in a leveling system incorporated in such system.

In each pump discharge line is a blocking valve assembly 33, which is so designed as to normally open in accordance with the work load on the pump which is feeding liquid therethrough. The resistance to opening of such valve may be controlled in part by a flow connection 35 from the discharge line of the other pump, at a point 37 downstream of the blocking valve in that line, whereby the flow connection will transmit the load pressure from the one discharge line to the control element in the blocking valve in the other discharge line. With such an arrangement, each blocking valve will respond to the load condition at the far end of the ram, to so adjust the loading on its associated pump as to maintain substantially equal loading on the pumps, despite any unbalancing of the work load on the hydraulic motors.

A system of the character described above, is disclosed in the patent issued to applicant for Precision Control System for Press Brakes or the Like, No. 2,906,096 of Sept. 29, 1959, and is used as a basis for the disclosure of the present invention, because of the added advantages which the invention offers when employed in conjunction with such a system.

In accordance with the present invention, I provide a servo-valve assembly 41 mounted on the frame 43 of the machine, in position to be stimulated by a leveling tape 45 affixed in a conventional manner across the backside of the ram, to be anchored at its opposite end to a fixed point of anchorage 47 on the frame.

Such servo-valve assembly comprises a housing 51 having a pair of intake ports 53, 55 and an intermediate exhaust port 57 and a valve 59 in the form of a spool slidable in said housing and having a valve element 61 of a length slightly less than the exposed dimension of the exhaust port 57 whereby, when the spool is adjusted to neutral position as depicted, it will permit of a slight but equal flow through each of the intake ports, and the valve assembly in this condition, may be said to be hydraulically balanced.

Any movement of the valve in either direction away from its neutral position, will permit of an increase in flow through one intake port, while reducing the flow through the other intake port, until a cut-off point is reached at one side of the exhaust port. Thus the flow in a line to one intake port may be said to be modulated in a positive direction, while the flow in a line to the other port may be said to be negatively modulated, and accordingly, the overall flow in a system in which such valve assembly may be employed, may be referred to as double modulated.

In the application of the servo-valve assembly to a system of the type illustrated, a flow connection 65 to the intake openings 55 is provided from the pump discharge lines 17 at a point upstream from the blocking valve in such discharge line, while a similar flow connection 67 to the other intake opening 53 is provided from the other pump discharge line 19 at a point similarly located upstream of the blocking valve in that line. A flow connection 69 from the exhaust port to the tank will complete the flow circuit through the servo-valve assembly.

In cooperation with the servo-valve assembly system, there is associated with each of the pumps 11 and 13, at its discharge side, a relief valve assembly 71, 73 respectively, to dump substantially the entire output of the associated pump to tank, when the servo-valve exceeds a predetermined distance of travel in the valve housing, the relief valve associated with one pump functioning in response to movement of the servo-valve in one direction, while the relief valve associated with the other pump functions in response to movement of the servo-valve in the opposite direction. Thus only one of these relief valves can function at any one time.

To trigger such relief valves at the proper time, I place a restriction 75, 77 in each of the flow connections 65, 67 respectively from the pumps to the intake ports of the servo-valve assembly, so as to build up a pressure drop across the restriction in that particular flow connection in which the flow increases with movement of the servo-valve, and utilize this pressure drop to control the proximate relief valve.

Figure 2:
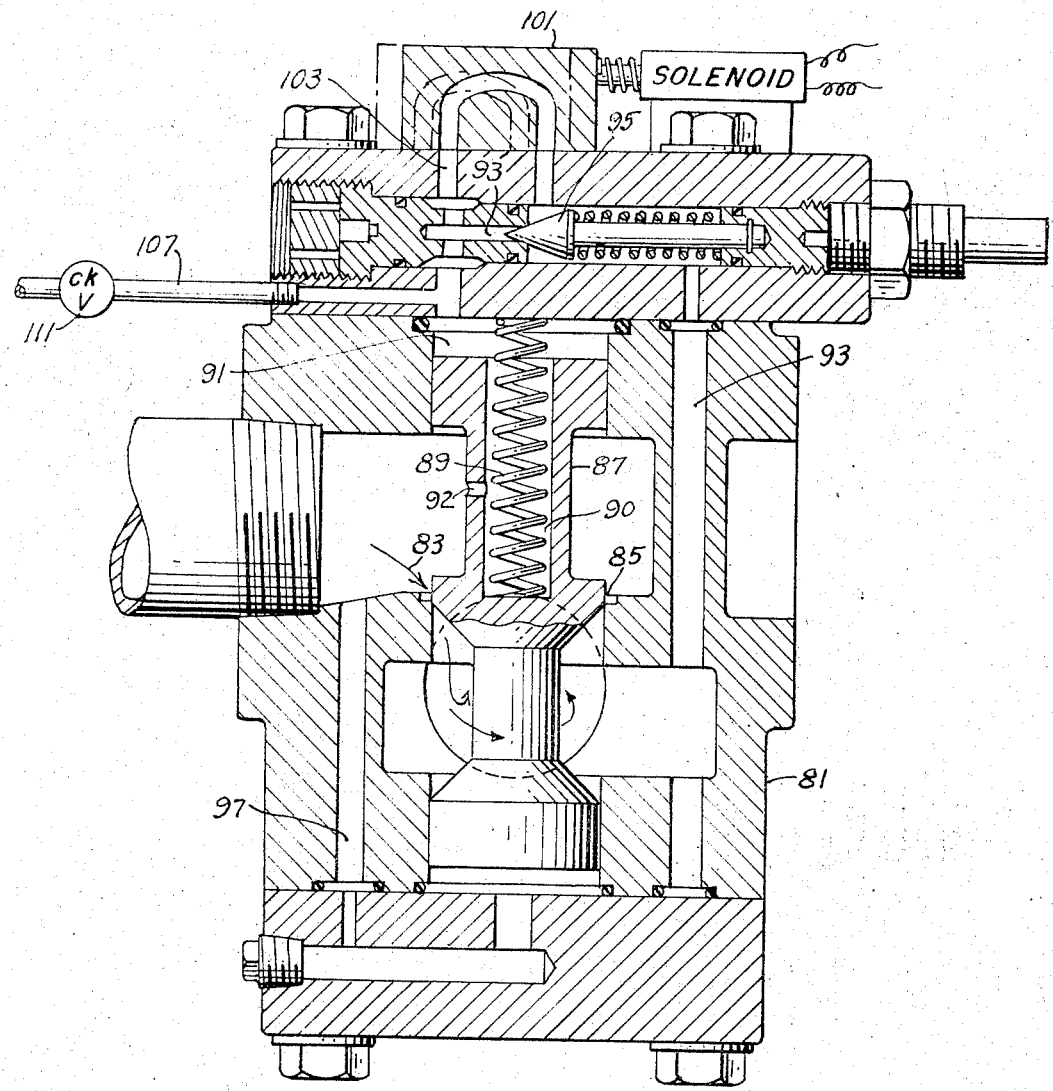
FIGURE 2 is a view in section through a valve assembly constituting an important feature of the hydraulic leveling system of FIGURE 1.

The specific relief valve assembly employed, may be one conventionally used in association with each pump for starting and stopping a machine, and for providing protection against excessive overload on a pump, as such valve assembly is capable of being converted in a simple manner, for application to the present invention, and without destroying its original functions in the system. Such a valve assembly is depicted in detail in FIGURE 2 of the drawings to which reference will be made.

Such valve assembly includes a valve housing 81 having an offset main flow passageway 83 therethrough, the input end for flow connection to a pump discharge line, while the discharge end is connected to tank. At an intermediate point in the main flow passageway is a valve seat 85 against which a spool shaped valve 87 is normally seated by a biasing spring 89 housed in a recess 90 and bearing against an upper wall to create a small chamber 91 adjacent that end of the valve. A small opening 92 through the wall of the recess, permits liquid communication with the inlet end of the main passageway while a relief passageway 93 from the small chamber 91 through a normally closed spring biased valve 95, connects with the outlet end of the main passageway.

An auxiliary passageway 97 from the input end of the main flow passageway to the opposite end of the spool shaped valve, will bring pump pressure to bear against this end of the valve in opposition to the pressure build up in the spring recess due to liquid pressure and that of the main valve biasing spring 89.

Any reduction of pressure against the upper end of the valve causing unbalance in excess of the resistance due to the spring pressure against the bottom of the recess 90, will serve to lift the main valve off its seat, at the same time building up sufficient pressure in the small chamber at the spring end of the main valve to unseat the valve 95 and thus allow full opening of the main valve, and thereby protect the associated pump.

Any build up of pressure in this valve will build up pressure at both ends of the spool. The spring will cause the valve to remain closed until the pressure becomes great enough to open valve 95.

When flow through valve 95 becomes great enough to drop the pressure in chamber 91 by an amount sufficient to overcome the force of the spring in recess 90 the valve will open.

In the normal operation of a machine, the start and stopping of the ram is accomplished through use of a solenoid actuated valve 101 which functions to open or close a by-pass passageway 103 around the supplemental valve 95, whereby a reduction of the pressure in the end chamber accomplished through a closing of this by-pass passageway, will cause the main valve to open and permit the associated pump to discharge directly to tank, and when both such relief valves are operated simultaneously, the ram under such conditions, will come to a stop, whereas when the by-pass passageway in each relief valve is simultaneously blocked, all the output of each pump will go to its respective hydraulic motor, to produce a stroke of the ram.

In converting the aforementioned valve assemblies to perform the additional function called for by the leveling system of the present invention, a flow connection 107 is provided from the end chamber 91 of each valve assembly to a point in the associated flow connection to a servo-valve intake port, located downstream of the constriction in such servo-valve flow connection, and in the flow connection 107 from the relief valve, a check valve 111 is installed, such check valve being calibrated to respond to the desired pressure drop across the associated constriction.

When the leveling system is thus set up and adjusted, it will have a characteristic response which is not only non-proportional to movements of the servo-valve, but after an initial but very brief movement of the servo-valve, any further movement will, due to a complete unloading of one pump, introduce a tremendous correction factor not even remotely approachable through any proportional response system. This may be readily appreciated from a consideration of the characteristic curves of FIGURE 3 of the drawings, wherein are depicted on XY axes, curves representative of both the prior art and the leveling system of the present invention.

Figure 3:
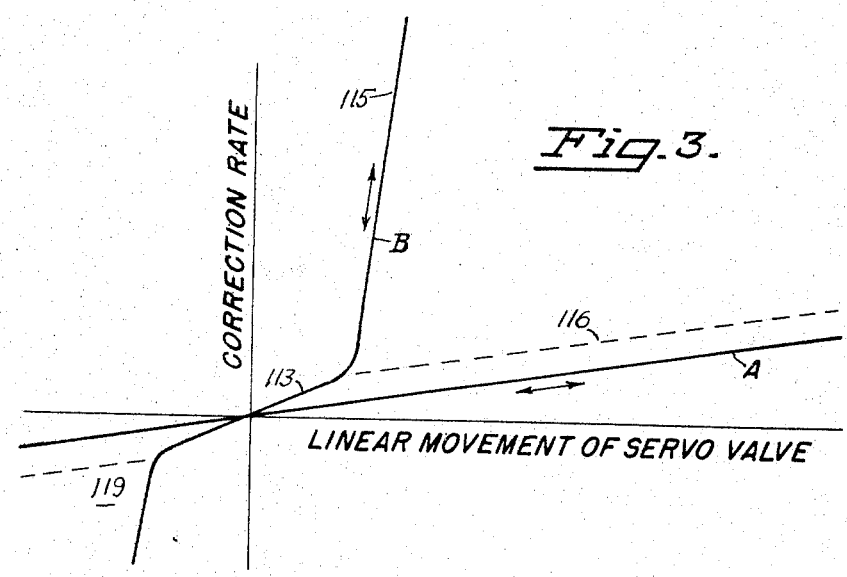
FIGURE 3 is a view depicting the non-proportional response characteristics of the leveling system of the present invention under different system arrangements.

Referring to FIGURE 3, curve A, which is a straight line through the origin of the XY axes, is representative of the continuous but proportional response characteristic of the prior art system, where the X axis represents linear movement of the servo-valve and the Y axis represents a restoration factor or correction effect. This prior art characteristic response curve thus indicates proportional bleeding from the line that connects to the lead piston, such bleeding increasing proportionately with deviation of the ram and decreasing proportionately as the ram is restored to its previously prevailing attitude.

The curve B of FIGURE 3, while continuous, will not in any sense of the word, be proportional, but will be definitely non-proportional, and will include a brief initial portion 113 representing a more or less gradual increase in corrective factor, followed by a very sharp increase 115 in corrective factor occasioned by the full unloading of that pump feeding the lead piston. While the initial portion of this characteristic curve has been referred to as representing a gradual increase in corrective factor, it will be noted that due to the double modulation prevalent during this initial portion of the characteristic curve, it will have a slope greatly exceeding that of any proportional response characteristic under comparable conditions.

In terms of the ram, this becomes quite significant in that such increase in corrective effect at the instant the ram starts to deviate, not only will tend to discourage further deviation but the corrective action set in motion, but in any event will shorten the period for restoring the ram to its previously prevailing attitude, and in some instances, conceivably affecting a correction during such initial period.

The curve B as described, exaggerates the double modulation perod, as normally it would occur probably within a movement of the servo-valve, of the order of a thousandth of an inch. This curve, further, presupposes that the opening of a relief valve occurs at the precise termination of the double modulation period, but this does not necessarily have to be, as opening of a relief valve may be timed to occur after an intervening moment of time, following double modulation, during which moment, operation will occur along the extension 116.

If one were to eliminate from the leveling system, the relief valve component portions with the associated restrictions, the characteristic response curve would take on a characteristic as indicated in the drawing by the extension 116. The resulting overall characteristic would, even under these conditions, indicate greater sensitivity than a leveling system operating along the proportional characteristic curve A, for at all points along such new curve, the corrective factor would far exceed that of a curve A under otherwise comparable conditions.

Were one to utilize a servo-valve wherein the exhaust port was completely blocked by the valve element in its symmetrical position, the system would take on characteristic response curve wherein the brief initial portion of the curve would follow briefly along the initial portion of a straight line curve A and then take its sharp turn upward when an associated relief valve opens to completely unload the pump with which it is associated. The net effect, as reflected in curve B, would be to lower the curve somewhat, the only real drawback to which, would be to eliminate the gains attributable to the double modulation.

The curves as they appear in the upper right hand quadrant, represent correction for ram deviation in one direction. A similar set of curves 119 in the lower left quadrant would then represent correction for ram deviation in the opposite direction.

It will be appreciated that each correction cycle may be pictured as starting from origin on the XY axis, traveling up a curve and returning down the curve back to the point of origin.

While one of the advantages attributable to the initial portion of the characteristic response curve B, that is before opening of a relief valve, was that it offered a greater corrective factor than the corresponding portion of the proportional response characteristic curve A at the very beginning of any deviation of the ram, and otherwise shortened the period of correction, this portion of the curve represents a feature of even greater importance when associated in combination with the sudden rise in the characteristic response shown, in that it enables one to adjust the system to function with exceptionally great rapidity in correcting for any marked deviation of the ram from a prevailing attitude, without incurring the problem of hunting.

In this connection it will be appreciated that the steep slope portion of the characteristic response curve represents incredibly fast correction, while the initial portion of the curve represents an approach to normalcy as the correction cycle approaches completion, which though quite rapid, is yet sufficiently slow to permit the ram to reestablish itself to its desired attitude without overshooting and causing a condition known as hunting.

In terms of the ram, what this actually means is that the ram will be restored exceedingly fast to a point closely approaching its previously prevailing attitude, at which instant, its rate of restoration will quickly drop to values which will permit the ram to approach its previously established attitude without overshooting to cause hunting. The changing attitude of the ram, through the tape feedback to the servo-valve, speedily brings the servo-valve back into the double modulation phase, when pressure is restored to the leading piston, while pressure is maintained against the lagging piston.

It will be appreciated that this desirable feature will be attainable whether one makes use of double modulation or not.

Figure 4:
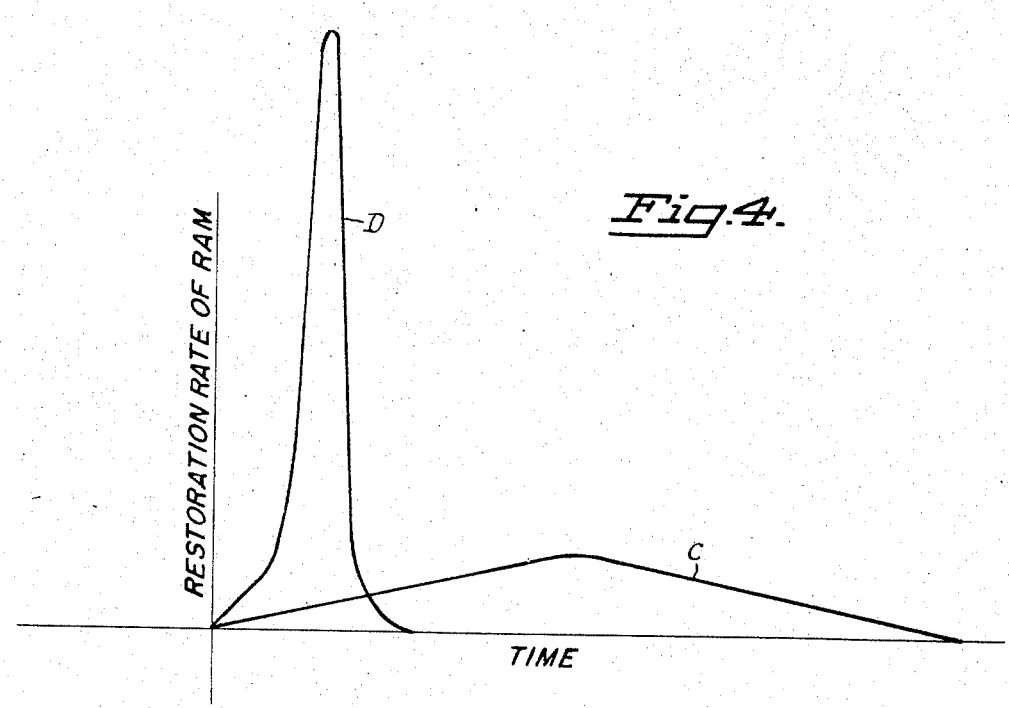
FIGURE 4 is a view depicting the effectiveness of the present invention by comparison with a prior art system.

The significance of operating along a curve such as curve B of FIGURE 3 may be appreciated from a consideration of the curves of FIGURE 4 wherein time has been plotted along the X-axis and restoration rate of the ram has been indicated along the Y-axis.

Restoration rate is the result of a combination of volume displacements acting simultaneously on both pistons, and is a function of the differential volume between that above one piston and that above the other. Under the prior art system which functions along the proportionality curve A of FIGURE 3, the volume displacement above the lagging piston, at best, remains substantially constant, while the displacement above the leading piston is gradually decreased to a point, and then increased back to its original value as the ram is restored to the previous prevailing attitude, from which it has deviated. The restorating rate is the instantaneous difference between the two displacements and is represented in FIGURE 4 by the curve C which, it will be appreciated, stretches over a substantial period of time, due to the fact that bleeding is attributed solely to movement of the servo-valve, and at no time does it ever reach any substantial magnitude.

When operating along curve B of FIGURE 3 in accordance with applicant's present invention, the hydraulic displacement above the lagging piston does not remain the same as during normal operation, but initially increases slightly due to the double modulation effect, while at the leading piston, the bleeding rate during the initial portion 113 of the curve B, will be substantially twice that during the same initial period of operation under curve A, when, due to opening of the associated relief valve, essentially all pressure will be withdrawn from the leading piston. As a consequence, the restoration rate of the ram will jump to an exceptionally high value, and just as suddenly drop when the ram reaches a position just short of its previously prevailing attitude and the relief valve closes, thus leaving the ram to terminate the restoration cycle along the initial portion of the correction rate curve.

At this point, the correction rate will diminish along the initial portion of the curve B to zero, thus permitting the ram to reach its final position without overshooting to cause hunting.

Thus restoration of the ram under the present system of control will be represented by the curve D of FIGURE 4, which curve will change slightly if the operation of the relief valve is adjusted to occur slightly beyond the double modulation phase.

Bearing in mind that the double modulation effect will discourage the ram from tilting as far as it otherwise would under the prior art system, a timing cycle for restoring the ram under the present invention, would be even shorter than one would otherwise expect under the circumstances.

While the present invention has been described with reference to a machine having a ram powered by a pair of spaced hydraulic motors, the same basic system can be employed in controlling the attitude of any long member or assembly which is powered by similarly spaced hydraulic motors.

From the foregoing description of my invention in its preferred form, it will be apparent that the same is subject to alteration and modification without departing from the underlying principles involved, and I accordingly do not desire to be limited in my protection to the specific details illustrated and described except as may be necessitated by the appended claims.

I claim:

1. A ram attitude control system for a hydraulically powered machine such as a press brake, shear, or the like, having a ram of substantial length, a hydraulic motor at each end of the ram, including a cylinder and a drive piston therein, a pump for each of said hydraulic motors and tank means for supplying liquid to said pumps, a discharge line from each of said pumps in flow connection to one of said hydraulic motors, and means responsive to deviation of said ram from a desired prevailing attitude, for continuously and non-proportionally unbalancing the hydraulic flow to said hydraulic motors, in the direction of restoring said ram to said desired prevailing attitude, to effect a larger corrective unbalance than obtainable with conventional proportional unbalancing under comparable conditions.

2. A ram attitude control system in accordance with claim 1, characterized by said continuous and non-proportional unbalancing means including a valve assembly comprising a housing having intake ports and an exhaust port, and a spool slidably disposed within said housing and including a valve element of a length less than the corresponding dimension of said exhaust port, whereby when symmetrically disposed with respect to said exhaust port, simultaneous and equal flow through said intake ports may occur, such flows to vary inversely with respect to each other, with shifting of said valve until cut-off of one of said intake openings occurs.

3. A ram attitude control system in accordance with claim 1, characterized by said continuously and non-proportional unbalancing means including a valve assembly having a valve housing with a pair of input ports and an exhaust port, a valve in said housing adapted for adjustment to a hydraulically symmetrical position with respect to said intake ports, a flow connection from one of said pump discharge lines to one of said intake ports, a flow connection from the other of said pump discharge lines to the other of said intake ports, a flow connection from said exhaust port to said tank means, and means responsive to movement of said valve beyond a predetermined distance in either direction for reducing hydraulic flow to the lead piston to substantially zero flow.

4. A ram attitude control system in accordance with claim 1, characterized by said continuously and non-proportional unbalancing means including a servo-valve assembly having a valve housing with a pair of intake ports and an exhaust port, a valve in said housing adapted for adjustment to a hydraulically symmetrical position permitting a like positive flow through each intake port simultaneously, a flow connection from one of said pumps to one of said intake ports, a flow connection from the other of said pumps to the other of said intake ports, a flow connection from said exhaust port to said tank means, and means responsive to tilting of said ram from a prevailing attitude, for double modulating, through shifting of said valve, the overall flow from said pumps to said hydraulic motors.

5. A ram attitude control system in accordance with claim 1, characterized by said continuously and non-proportional unbalancing means including a servo-valve assembly having a valve housing with a pair of intake ports and an exhaust port, a valve in said housing adapted for adjustment to a hydraulically symmetrical position with respect to said exhaust port, said valve including a valve element of a length less than the corresponding dimension of said exhaust port to provide double modulation of the overall flow of said pumps upon movement of said valve from its symmetrical position to cut-off of flow through one of said intake ports, a flow connection from one of said pumps to one of said intake ports, a flow connection from the other of said pumps to the other of said intake ports, a flow connection from said exhaust port to said tank means, and means responsive to tilting of said ram from a prevailing attitude, for shifting said valve to double modulate the overall flow from said pumps to said hydraulic motors, until cut-off of one of said intake openings occurs.

6. A ram attitude control system as recited in claim 1, characterized by means for substantially removing complete flow to said leading piston in response to a change in attitude of said ram beyond a limit sufficient to discourage hunting as said pistons are restored to their prior relationship and said ram approaches its previously prevailing attitude.

7. A ram attitude control system as recited in claim 6, characterized by said flow removing means as including a by-pass flow line from each of said pumps to said tank means, a normally closed by-pass valve assembly in each of said by-pass lines, and means responsive to a maximum predetermined flow through either of said intage openings of said valve assembly for opening that by-pass valve assembly in the by-pass line from the pump which is supplying the leading piston.

8. A ram attitude control system for a hydraulically powered machine such as a press brake, shear, or the like, having a ram of substantial length, a drive assembly at each end of the ram and including a cylinder and a drive piston therein, a pair of pumps for powering said drive assemblies and a tank means for supplying liquid to said pumps, a discharge line from each of said pumps, a branch line from each of said discharge lines to the pressure side of a different one of said drive pistons and a second branch line from each of said discharge lines to the lift side of the remaining drive piston, and selectively operable valve means in each of said branch lines; said ram attitude control system being characterized by means for stabilizing said ram against unbalanced loading of said drive pistons, and at the same time substantially balancing the pressures at said pumps, and means utilizing said substantially balanced pump pressures and responsive to a deviation of said ram from a desired prevailing attitude, for re-establishing said ram to its desired attitude.

9. A ram attitude control system as recited in claim 8, characterized by said attitude re-establishing means as including a valve assembly having a pair of intake openings and an exhaust opening, a flow connection to one of said intake openings from one of said pumps, a similar flow connection to the other intake opening from the other of said pumps, and a valve in said assembly exposing said exhaust opening to a minimal substantially balanced flow through said intake openings when said valve is symmetrically disposed hydraulically in relationship to said openings, whereby to double modulate power flow to said drive assemblies with movements of said valve, by decreasing flow to the lead piston and increasing flow to the lagging piston.

10. A ram attitude control system as recited in claim 9, characterized by said valve being in valving relationship to said exhaust opening and of a size to only partially block said opening when symmetrically disposed with respect thereto.

References Cited
UNITED STATES PATENTS

| | | | |
|---|---|---|---|
| 2,603,145 | 7/1952 | Dreis | 60—97 |
| 2,859,591 | 11/1958 | Zimmerman | 60—97 |
| 3,059,431 | 10/1962 | Munschauer et al. | 91—171 |
| 3,154,925 | 11/1964 | De Vita | 60—97 |

EDGAR W. GEOGHEGAN, *Primary Examiner.*